Feb. 11, 1941.  E. L. HARDER  2,231,717
POLYPHASE WATTMETRIC RELAY
Filed March 31, 1939  2 Sheets-Sheet 1

WITNESSES:
Edward Michaels
Thos. C. Groome

INVENTOR
Edwin L. Harder.
BY O. B. Buchanan
ATTORNEY

Feb. 11, 1941.  E. L. HARDER  2,231,717

POLYPHASE WATTMETRIC RELAY

Filed March 31, 1939  2 Sheets-Sheet 2

WITNESSES:
Edward Michaels
Wm. C. Groome

INVENTOR
Edwin L. Harder.
BY O. B. Buchanan
ATTORNEY

Patented Feb. 11, 1941

2,231,717

UNITED STATES PATENT OFFICE 2,231,717

POLYPHASE WATTMETRIC RELAY

Edwin L. Harder, Forest Hills, Pa., assignor to Westinghouse Electric & Manufacturing Company, East Pittsburgh, Pa., a corporation of Pennsylvania Application March 31, 1939, Serial No. 265,255

38 Claims. (Cl. 175—294)

My invention relates to improved polyphase wattmeter mechanisms for obtaining responses on three-phase lines which are subject, at times, to zero-phase-sequence currents and voltages. More particularly, my invention relates to a combination phase- and ground-directional element which responds in the proper direction for any of the ten different types of fault, substantially regardless of the line-current conditions immediately preceding the occurrence of the fault. Still more particularly, my invention relates to a novel means utilizing only two wattmeter elements for obtaining a predetermined response or responses to both the positive phase-sequence power and the negative-phase sequence power, to the exclusion of all hybrid responses of a voltage of one phase-sequence system with a current of another phase-sequence system.

The common three-phase wattmeter connection utilizes three single-phase wattmeter elements, each having a voltage winding and a current winding, the two windings being energized with corresponding phases of voltages and currents, respectively, so that the sum of the three responses is equal to the desired polyphase response. A two-element wattmeter connection is also known, whereby a somewhat similar, yet substantially different, response is obtained with only two elements, each having one winding energized from a single phase of current or voltage, while the other winding is energized differentially from two voltages or currents, but careful test and strict mathematical analysis shows that this two-element wattmeter connection produces the aforesaid hybrid or mixed-phase-sequence expressions which introduce wholly meaningless and erroneous torque-components tending to produce erroneous or inaccurate results.

My invention, in some of its aspects, is based upon the discovery that it is possible to obtain a satisfactory two-element wattmeter connection by causing the two voltage windings to be energized with differential responses to two different pairs of line-derived voltages, and causing the two current windings to be energized with differential response to two different pairs of line-derived currents, the several pairs of voltages and currents being so chosen that a response is obtained solely to the positive-phase-sequence and negative-phase-sequence powers, or products of current and voltage times the cosine of an angle, to the exclusion of all other products. It is possible to so choose the phases that the positive and negative phase-sequence responses are additive in phase with each other, or in phase opposition to each other, or arranged with a 60-degree phase-angle between them, or, in general, any phase-angle.

A still further object of my invention is to provide a polyphase wattmeter mechanism which is suitable for determining fault-current direction in a protected three-phase line, in such manner as to obtain correct directional indication for both phase and ground faults. Such a directional element will have a response in which the real part of the negative-sequence response will be in phase with the real part of the fault component of positive-sequence response, and it may also, in addition, have one or two additional wattmeter elements responding to either or both of a function of the zero-phase-sequence power and a polyphase voltage restraint. Heretofore, a very large number of wattmeter connections and combinations have been investigated, and some of them have been used, with unreliable relaying operations, but the precise means or combinations for obtaining the best results have not been singled out, recognized, or produced in actual practice.

A still further object of my invention is to utilize a directional element in a protective relaying system for a three-phase line, said directional element comprising a two-element wattmeter mechanism, in accordance with my invention, wheren the positive- and negative-sequence power-responses are a maximum at different angles between the current and voltage, so that the positive-sequence response can be adjusted to have a minimum response to the normal fault-free positive-phase-sequence line-currents at any particular power-factor angle, and this particular power-factor angle may be chosen in accordance with the line-conditions which are the most likely to cause an incorrect fault-current directional response in the directional relay element. Under these conditions, the directional element responds selectively to the fault-currents alone, substantially excluding any response to the superimposed load-currents which are flowing in the line at the same time.

A still further object of my invention is to provide a new and general means for effecting a symmetrical linear transformation of a system of polyphase vectors, which will rotate the positive- and negative-sequence components by the same angle but in opposite directions. This is particularly useful in power or volt-ampere measurements, in altering the power-factor angles of maximum wattmetric response. If the zero-sequence component is absent or eliminated, from the transformed quantity, the transformation will not introduce any "hybrid" responses to products of voltage of one phase-sequence and a current of another.

With the foregoing and other objects in view, my invention consists in the methods, systems, circuits, apparatus and combinations hereinafter described and claimed, and illustrated in the accompanying drawings, wherein:

Figure 1:
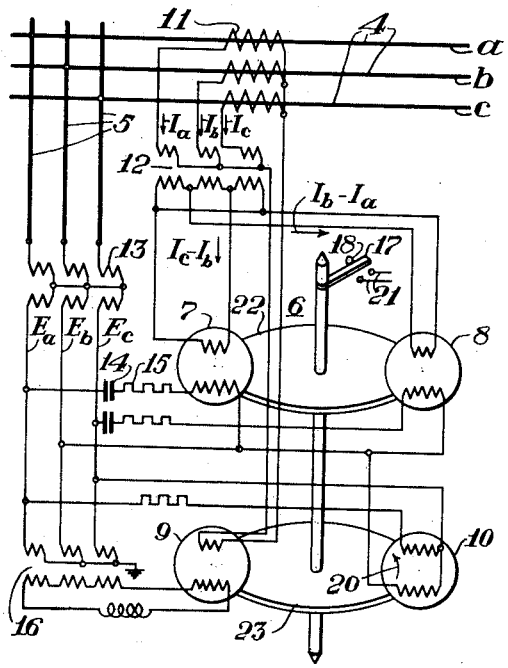
Figure 1 is a diagrammatic view of circuits and apparatus illustrating my invention in a form utilizing a four-element wattmeter mechanism in which the first two elements jointly respond selectively to the positive and negative-phase-sequence powers, in a predetermined manner, while the other two elements respond respectively to zero-phase-sequence power and voltage-restraint.

In the following explanation of my invention, I shall, in general, utilize the same conventions as those explained in a book entitled "Symmetrical components," by C. F. Wagner and R. D. Evans, published in 1933 by McGraw-Hill Book Company. In general, it may be noted that the different phases of the star currents and voltages are designated by lower-case subscripts $a$, $b$, $c$, wherein phase-$b$ is the next lagging phase after phase-$a$, and phase-$c$ is the next lagging phase after phase-$b$, while phase-$a$ is the next lagging phase after phase-$c$. In like manner, the delta quantities are indicated by capital subscripts A, B, C. The positive-, negative- and zero-phase-sequence components are designated by the subscripts 1, 2 and 0, respectively. Conjugate vectors are distinguished by a circumflex accent, while the absolute or scalar values of the vectors are indicated by bars placed over the symbol for the vector. The fundamental phase-sequence equations for the different phases of the voltages and currents are given by the following equations:

$$\left. \begin{array}{l} E_a = E_0 + E_1 + E_2 \\ E_b = E_0 + a^2 E_1 + a E_2 \\ E_c = E_0 + a E_1 + a^2 E_2 \end{array} \right\} \quad (1)$$

and $$\left. \begin{array}{l} \hat{I}_a = \hat{I}_0 + \hat{I}_1 + \hat{I}_2 \\ \hat{I}_b = \hat{I}_0 + a\hat{I}_1 + a^2\hat{I}_2 \\ \hat{I}_c = \hat{I}_0 + a^2\hat{I}_1 + a\hat{I}_2 \end{array} \right\} \quad (2)$$

where $$a = e^{j120°} = -\frac{1}{2} + j\frac{1}{2}\sqrt{3}$$

$$a^2 = e^{j240°} = -\frac{1}{2} - j\frac{1}{2}\sqrt{3}$$

$$j = e^{j90°}$$

and $e =$ base of natural logarithms.

My invention, in at least one of its aspects, is predicated upon the discovery of the following seven fundamental equations, and variations thereof as will be subsequently described, which will give a response to a function of what I here call the positive-phase-sequence "power," or $E_1\hat{I}_1 = P$, plus or minus a function of the negative-phase-sequence power $E_2\hat{I}_2 = N$, to the substantial exclusion of any response to the zero-phase-sequence power $E_0\hat{I}_0 = Z$, and also to the substantial exclusion of any hybrid products of a voltage of one phase-sequence with the current of another phase-sequence. These seven fundamental equations are as follows:

$$(E_b - E_a)(\hat{I}_b - \hat{I}_c) - (E_b - E_c)(\hat{I}_b - \hat{I}_a)$$
$$= 3\sqrt{3}(E_1\hat{I}_1 - E_2\hat{I}_2)e^{-j90°} \quad (3)$$

$$(E_c - E_a)(\hat{I}_b - \hat{I}_0) + (E_b - E_a)(\hat{I}_a - \hat{I}_0)$$
$$= 3(E_1\hat{I}_1 e^{-j30°} - E_2\hat{I}_2 e^{j30°})e^{-j90°} \quad (4)$$

$$(E_b - E_a)(\hat{I}_a - \hat{I}_c) + (E_c - E_a)(\hat{I}_b - \hat{I}_c)$$
$$= 3(E_1\hat{I}_1 e^{-j30°} - E_2\hat{I}_2 e^{j30°})e^{-j90°} \quad (5)$$

$$(E_c - E_a)(\hat{I}_b - \hat{I}_o) + (E_c - E_b)(\hat{I}_c - \hat{I}_a)$$
$$= 3(E_1\hat{I}_2 e^{j30°} - E_2\hat{I}_2 e^{-j30°})e^{-j90°} \quad (6)$$

$$(E_b - E_a)(\hat{I}_a - \hat{I}_c) + (E_a - E_o)(\hat{I}_a - \hat{I}_b)$$
$$= 3(E_1\hat{I}_1 e^{j30°} - E_2\hat{I}_2 e^{-j30°})e^{-j90°} \quad (7)$$

$$(E_c - E_a)(\hat{I}_c - \hat{I}_o) + (E_b - E_a)(\hat{I}_b - \hat{I}_a)$$
$$= 3(E_1\hat{I}_1 + E_2\hat{I}_2) \quad (8)$$

$$(E_c - E_o)(\hat{I}_a - \hat{I}_c) + (E_b - E_o)(\hat{I}_a - \hat{I}_b)$$
$$= 3(E_1\hat{I}_1 + E_2\hat{I}_2) \quad (9)$$

In interpreting the foregoing equations, it should be noted that any phase of the line may be arbitrarily lettered as the reference-phase $a$, while the next lagging phase will be $b$, and the other one $c$, so that the subscripts $a$, $b$, $c$ in Equations 3 to 9 may be replaced, respectively, by the subscripts $b$, $c$, $a$ or by $c$, $a$, $b$, without any change in the result.

Examination of the seven equations will show that Equation 3 provides a response to $(P-N)$, while Equations 4 to 7 provide a differential response to P and N with a 60-degree phase-angle between them, while Equations 8 and 9 provide a response to $(P+N)$. The significance of these various responses will be better appreciated when it is remembered that the actual power, or true watts, in the line, is equal to $$3(E_1\hat{I}_1 + E_2\hat{I}_2 + E_0\hat{I}_0) = 3(P+N+Z) \quad (10)$$

When the wattmeter mechanism is utilized as a directional element for responding to the directions of fault-currents in a protected line, it is not desired to have a response to the actual power, as represented in Equation 10. The desired response is a response which is responsive solely to the superimposed fault-currents, preferably to the exclusion of the load-currents, unless the fault-currents are so much larger than the load-currents that the latter may safely be disregarded, and this desired response is also one in which the directions of the negative and zero-phase-sequence responses N and Z are reversed with respect to the positive-sequence response P, as indicated by the equation $$E_1\hat{I}_1 - E_2\hat{I}_2 - KE_0\hat{I}_0 = P - N - KZ \quad (11)$$

where K is any constant of any predetermined phase-angle and magnitude. This is because the fault itself becomes the source of the negative and zero phase-sequence currents and voltages, so that these particular currents are flowing back from the fault, instead of flowing out to the fault, as in the case of the positive-sequence currents, as described and claimed in a copending application of B. E. Lenehan, E. L. Harder and W. A. Lewis, Serial No. 265,254, filed March 31, 1939, and assigned to the Westinghouse Electric & Manufacturing Company.

It will be noted that the seven fundamental Equations 3 to 9 are expressed in terms of star currents and voltages, and that these star currents and voltages are combined differentially, either with other star currents and voltages, or with the corresponding zero-sequence components, so as to exclude the zero-sequence components from the difference.

If we understand that the different quantities utilized are, in each case, to be quantities having no zero-phase-sequence components, we can very much simplify these equations, making them easier to remember, by utilizing the various star-to-delta transformations $$E_A = E_c - E_b$$
$$E_B = E_a - E_c \quad \quad \quad \quad (12)$$
$$E_C = E_b - E_a$$

and $$I_A = I_c - I_b$$
$$I_B = I_a - I_c \quad \quad \quad \quad (13)$$
$$I_C = I_b - I_a$$

giving $$-E_C \hat{I}_A + E_A \hat{I}_C = 3\sqrt{3}(E_1 \hat{I}_1 - E_2 \hat{I}_2)e^{-j90°} \quad (14)$$

$$-E_B \hat{I}_b + E_C \hat{I}_a = 3(E_1 \hat{I}_1 e^{-j30°} - E_2 \hat{I}_2 e^{j30°})e^{-j90°} \quad (15)$$

$$E_b \hat{I}_B - E_c \hat{I}_A = 3(E_1 \hat{I}_1 e^{-j30°} - E_2 \hat{I}_2 e^{j30°})e^{-j90°} \quad (16)$$

$$-E_B \hat{I}_b + E_A \hat{I}_c = 3(E_1 \hat{I}_1 e^{j30°} - E_2 \hat{I}_2 e^{-j30°})e^{-j90°} \quad (17)$$

$$E_b \hat{I}_B - E_a \hat{I}_C = 3(E_1 \hat{I}_1 e^{j30°} - E_2 \hat{I}_2 e^{-j30°})e^{-j90°} \quad (18)$$

$$-E_B \hat{I}_c + E_C \hat{I}_b = 3(E_1 \hat{I}_1 + E_2 \hat{I}_2) \quad (19)$$

$$E_c \hat{I}_B - E_b \hat{I}_C = 3(E_1 \hat{I}_1 + E_2 \hat{I}_2) \quad (20)$$

It will be noted that the results, in each case, are given in terms of the positive and negative phase-sequence components of the star currents and voltages, as indicated by $\hat{I}_1$, $\hat{I}_2$, $E_1$ and $E_2$, and this is true even though the left-hand side of Equation 14 is expressed solely in terms of delta currents and voltages. In Equation 14, the result may be expressed in terms of the positive and negative phase-sequence components of the delta currents and voltages, which may be designated as $\hat{I}_{A1}$, $\hat{I}_{A2}$, $E_{A1}$ and $E_{A2}$, as indicated by the following equation $$-E_C \hat{I}_A + E_A \hat{I}_C = 3(E_{A1} \hat{I}_{A1} - E_{A2} \hat{I}_{A2})e^{-j90°} \quad (21)$$

It will be further noted, from a study of the two groups of the seven fundamental Equations 3 to 9 and 14 to 20, or 21, that the essential thing concerning these equations is that they shall refer to polyphase systems of vectors in which the phases a, b, c, fall one after another, with each phase lagging behind the preceding one, regardless of whether these phases are designated by lower-case or capital subscripts, for star or delta quantities, respectively, the successive angles of lag being 120° under balanced positive-phase-sequence line-conditions. It will be further noted that a delta voltage or current, such as $E_B$ is 90-degrees related to the correspondingly numbered star current or voltage, such as $I_b$, under balanced positive-phase-sequence line-conditions at unity power-factor. These considerations help in interpreting Equations 14 to 21, and in writing equivalent equations. Thus, it will be seen that Equations 15 and 16, Equations 17 and 18, and Equations 19 and 20 are related pairs of equations in which star quantities have been exchanged for delta quantities and vice versa. It may also be noted that the delta equation 21 may be written as a star equation as follows:

$$-E_c \hat{I}_a + E_a \hat{I}_c = \sqrt{3}(E_1 \hat{I}_1 - E_2 \hat{I}_2)e^{-j90°} \quad (22)$$

In all of the Equations 14 to 22, it is necessary to remember that the zero-sequence components of both the currents and the voltages must be excluded from each one of the two left-hand terms of the equations, corresponding to the two single-phase wattmeter elements of my invention.

Figure 2:
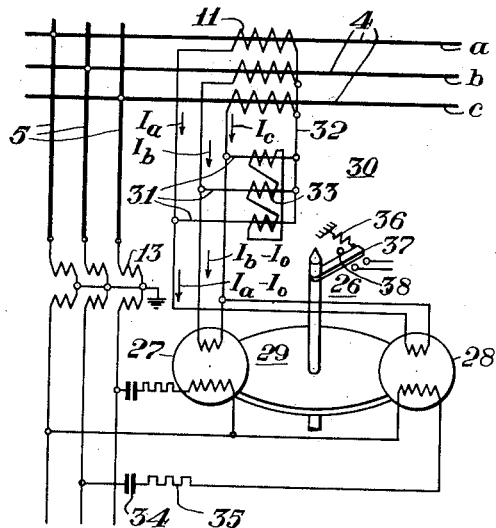
Figs. 2 and 3 are similar views illustrating modified forms of connection for the first two wattmeter elements.
Figure 3:
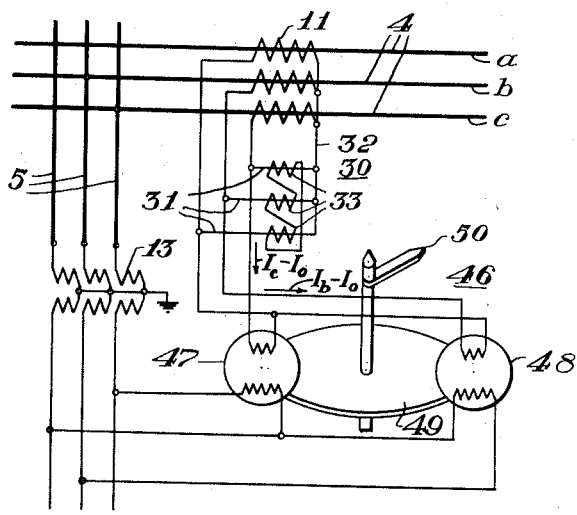

To illustrate the invention, Equations 3, 4 and 8 are embodied in apparatus which is shown in Figs. 1, 2 and 3, respectively.

In Fig. 1, a protected three-phase line is indicated at 4, with its individual phase-conductors distinguished by the letters a, b and c. This line 4 is represented as extended out from a station-bus 5. A directional wattmeter 6 is provided, having four single-phase wattmeter elements 7, 8, 9 and 10. These wattmeter elements may be visualized as each having a voltage winding and a current winding and as each having the property of producing a maximum response when the impressed voltage is in phase with the impressed current.

A set of line current transformers 11 is provided for deriving currents corresponding to the three line-currents $I_a$, $I_b$ and $I_c$. A set of auxiliary current transformers 12 is utilized to derive the differential currents $(I_c - I_b)$ and $(I_b - I_a)$, and these differential currents are supplied to the current windings of the first and second wattmeter elements 7 and 8, respectively.

A set of potential transformers 13 is provided for deriving the voltages $E_a$, $E_b$ and $E_c$ which are utilized for energizing the voltage windings of the first and second wattmeter elements 7 and 8 in such manner that the voltage winding of the first element 7 responds to $(E_b - E_a)$, while the voltage winding of the second element 8 responds to $(E_b - E_c)$. In each case the energizing-circuit for the voltage windings of these first and second wattmeter-elements 7 and 8 includes a phase-rotational multiplier which is illustrated in the form of a capacitor 14 and a resistor 15, for the purpose of rotating the impressed voltage through a positive (or leading) angle which may be suitably adjusted, as will be subsequently described.

The third wattmeter element 9, in Fig. 1, is energized in accordance with the zero-sequence current and the zero-sequence voltage, the former being derived from the two star-connected banks of current-transformers 11 and 12, while the latter is derived from a bank of auxiliary potential transformers 16 having secondary windings connected in open delta for supplying the voltage winding of the wattmeter-element 9.

The fourth wattmeter element 10, in Fig. 1, is energized so as to be responsive to the polyphase voltages $E_a$, $E_b$, $E_c$, in a well-known manner, the connections being such that the polyphase voltages tend to actuate the wattmeter mechanism 6 so that its movable manner 17 is pressed back against a backstop 18, as indicated by the arrow 20 on the fourth wattmeter element 10. The movable wattmeter member 17 may be the movable element of a relay contact of any sort, for controlling a relaying circuit 21.

In the particular embodiment of the invention illustrated in the drawings, the various wattmeter elements 7, 8, 9 and 10 are each indicated as the stator member of a disc-type wattmeter in which the wattmeter torques are developed as a result of eddy currents induced in two discs 22 and 23, the first disc 22 being operated upon by the first two wattmeter elements 7 and 8, and the other disc 23 being operated upon by the other two wattmeter elements 9 and 10. It is to be understood, however, that any other known or available type of wattmeter construction may be substituted.

The direction of energization of the first two wattmeter elements 7 and 8, in Fig. 1, is in accordance with Equation 3, and is such that the wattmeter tends to move away from its backstop 18 when the positive-phase-sequence current $I_1$ is flowing out into the protected line-section from the relaying station which is located at the bus 5, and when the negative-phase-sequence current $I_2$ is flowing back towards the bus 5 from the protected line-section 4. The direction of energization of the zero-sequence wattmeter element 9 is such that it tends to move the wattmeter away from its backstop when the zero-phase-sequence line-current $I_0$ is flowing back toward the bus 5 from the protected line-section 4.

Expressed in words, the connections of the first and second wattmeter elements 7 and 8 of Fig. 1 are as follows: The first wattmeter element 7 is energized with a first line-derived voltage $(E_b - E_a = E_c)$, and with a first line-derived current $(I_a - I_b) = I_A$ which lags said first derived voltage $E_c$ by 120° under balanced positive-phase-sequence line- conditions at unity power-factor. The second wattmeter element 8 is energized with a second line-derived voltage $(E_c - E_b) = E_A$ which lags said first derived voltage $E_c$ by 120° under balanced positive-phase-sequence line-conditions, and with a second derived current $(I_b - I_a = I_c)$ which is in phase with said first derived voltage $E_c$ under balanced positive-phase-sequence line-conditions at unity power-factor. From Equations 3 and 14 and from Fig. 1, it will be evident that the relative connections, or directions of connections, of either the voltage winding or the current winding of the second wattmeter element 8 is reversed with respect to the connections in the first wattmeter element 7.

It will be understood that the optimum phase-angle and the magnitude of the torque developed by the zero-sequence element 9 may be such as to cause the three elements 7, 8 and 9 to satisfy an equation such as Equation 11 as heretofore discussed.

The vector K, in Equation 11, makes it possible, not only to adjust the zero-sequence wattmeter-element 9 so as to develop its optimum torque at the zero-sequence fault-current power-factor which is obtained in the particular transmission line which is to be protected, but it also makes it possible for the entire wattmeter mechanism to have a much stronger response to the zero-sequence current $I_0$ than to either one of the positive or negative phase-sequence currents $I_1$ or $I_2$, as in the case of poorly grounded transmission systems in which the zero-sequence fault-current $I_0$ may be relatively small compared to the positive-sequence load-current $I_1$ which may be flowing at the same time. By suitably weighting the zero-sequence response, through the weighting-vector K, it is possible to make the wattmetric directional torque developed by the zero-sequence element 9 larger than the wattmetric torques developed jointly by the first and second wattmetric elements 7 and 8, so as to make the directional relaying element properly responsive to the direction of the zero-sequence current-flow, regardless of the direction of the load-current power-flow at the same instant.

In operation, the wattmeter mechanism of Fig. 1 is normally held in inoperative position, against its backstop 18, by the polyphase-voltage-responsive restraint of the fourth wattmeter element 10, or, in general, by any equivalent means for normally applying a restraint during fault-free line-conditions, and for removing or lessening said restraint in response to a fault-condition in the line, as when the polyphase line-voltages collapse or partially collapse. Normally, the response of the first and second wattmeter elements 7 and 8 to the balanced positive-phase-sequence load-currents in the line is not sufficient to overcome the restraint of the fourth element 10. During fault-conditions, however, the response of the first and second elements 7 and 8 to a function of the negative-phase-sequence product $-E_2\hat{I}_2$ and the response of the third element 9 of a function of the zero-phase-sequence product $-E_0\hat{I}_0$, assist the response of the first and second elements to a function of the positive-phase-sequence product $E_1\hat{I}_1$ in overcoming the reduced restraint of the fourth element so as to actuate the relay, provided that the fault is on the line-side of the relay, and regardless of the nature of the fault, whether a three-phase fault, a line-to-line phase-fault, a double line-to-ground phase-fault, or a single line-to-ground fault.

In Fig. 2, I have shown a wattmeter 26 having two wattmeter-elements 27 and 28 operating upon a disc 29. The energization of the wattmeter elements in Fig. 2 is in accordance with Equation 4. The currents $(I_b - I_0)$ and $(I_a - I_0)$ are obtained from the line-current transformers 11 by means of a zero-sequence current-filter 30 in the form of three conductors 31 leading respectively from the three phase-conductors of the current-transformer secondaries to the neutral return-conductor 32, with auxiliary current-transformers 33 associated with the several conductors 31 and having their secondary windings short-circuited in a closed delta circuit, so as to permit the unimpeded flow of the zero-phase-sequence currents $I_0$ through the conductors 31, while preventing any substantial current-flow of either of the other two components $I_1$ and $I_2$. In this manner, I obtain the currents $(I_b - I_0)$ and $(I_a - I_0)$ which are applied to the current windings of the two wattmeter elements 27 and 28, respectively.

The voltage windings of the two wattmeter elements 27 and 28, in Fig. 2, are energized, in accordance with Equation 4, with the voltages $(E_c - E_a)$ and $(E_b - E_a)$, respectively, through phase-rotational multipliers 34—35 which are similar to the phase-rotational multipliers 14—15 of Fig. 1.

Expressed in words, the wattmeter connections in Fig. 2 are as follows: The first wattmeter element 27 is energized with a first line-derived delta voltage $(E_a - E_c) = E_B$, and with a first line-derived star current $I_b$ which has a 90° relation to the voltage $E_B$ under balanced positive-phase-sequence line-conditions at unity power-factor. The second wattmeter element 28 is energized with a second line-derived delta voltage $(E_b-E_a)=E_C$ which is the next lagging phase in the same delta system of vectors of which $E_B$ is a part, and with a second line-derived star current $I_a$ which is the next star current leading $I_b$. Or, instead of the foregoing, as indicated in Equation 15, Equation 16 indicates that the words "delta" and "star" might have been interchanged, in the description of the connections. As before, the connections of either the voltage winding or the current winding of the second wattmeter element 28 is reversed with respect to the connections in the first wattmeter element 27.

The wattmeter mechanism 26 which is shown in Fig. 2 is illustrated as being provided with a biasing spring 36 for holding its movable element 37 against the backstop 38.

In the form of embodiment of my invention shown in Fig. 3, a wattmeter mechanism 46 is provided with two wattmeter elements 47 and 48, illustrated as operating on a single disc 49. The connections are those which are indicated in Equation 8, being achieved by current and voltage transformation-means similar to those which have already been described. Thus, the first wattmeter element 47 has its current coil energized in accordance with $(I_c-I_0)$, and its voltage coil energized in accordance with $(E_c-I_a)$ without any phase-rotational multiplier, while the second wattmeter element 48 has its current coil energized in accordance with $(I_b-I_0)$ and its voltage coil energized in accordance with $(E_b-E_a)$ without any phase-rotational multiplier. The wattmeter 46 in Fig. 3 is shown, by way of example, as an indicating wattmeter having a pointer 50.

Expressed in words, the wattmeter connections shown in Fig. 3 may be described as follows. One of the wattmeter elements, 48, is energized with a first line-derived delta voltage $(E_b-E_a)=E_C$, and with a first line-derived star current $I_b$ which leads the voltage $E_c$ by 30° under balanced positive-phase-sequence line-conditions at unity power-factor. The other wattmeter element 47 is energized with a second line-derived delta voltage $(E_a-E_c)=E_B$ which is the next leading phase of the delta system of vectors of which $E_C$ is a part, and with a second line-derived star current $I_c$ which lags behind $I_b$. Comparison of Equations 19 and 20 shows that the delta quantities could be currents instead of voltages, and the star quantities voltages instead of currents. As before, the connections of either the voltage winding or the current winding of the wattmeter element 47 is reversed with respect to the connections in the wattmeter element 48.

While I have described three specific embodiments of my invention, it will be understood that various features may be substituted from one figure to the other, such as the means for abstracting the zero-sequence component by means of a zero-sequence filter, from either the relaying-current source or the relaying-voltage source, and the use or omission of either of the third and fourth wattmeter elements 9 and 10 which are shown in Fig. 1 and which may be used or omitted with either of the other figures as well. It is also readily understood that the various equation-transformations which have been previously discussed may be utilized in effecting various modifications utilizing equivalent circuits, or substantially equivalent circuits.

Thus, Fig. 1 may be regarded as being illustrative of Equations 3, 14, 21, or 22; Fig. 2 may be regarded as being illustrative of Equations 4 to 7 and 15 to 18; while Fig. 3 may be regarded as being illustrative of Equations 8, 9, 19 or 20.

In considering the utility or application of my novel wattmeter construction and connection, to the problem of securing a correct polyphase directional indication for protecting a transmission-line against the various kinds of faults, the following considerations will be helpful. In most transmission-systems, the system-impedances for the positive and negative phase-sequence components are substantially invariably equal in phase-angle, and the zero-sequence impedance-component is either approximately equal, in phase angle, to the positive and negative impedance-components, or of such high impedance, as by reason of high grounding resistance, that it does not greatly affect the phase-angle of the fault-currents. Since the positive and negative phase-sequence currents $I_1$ and $I_2$ have the same phase-angular relation to their respective voltages $E_1$ and $E_2$, as will be indicated subsequently by the angles A or B, we may write, therefore, the following equations:

$$\overline{E}_1\overline{I}_1=\overline{P}, \text{ for unity power-factor} \quad (23)$$

$$\overline{E}_2\overline{I}_2=\overline{N}, \text{ for unity power-factor} \quad (24)$$

$\theta=$ load-current power-factor angle (lagging) \quad (25)

$A=$ fault-current power-factor angle (lagging) for three-phase and line-to-line faults \quad (26)

$B=$ fault-current power-factor angle (lagging) for ground-faults \quad (27)

$C=\theta$ under conditions the most likely to cause incorrect fault-current directional response \quad (28)

$D=$ combined fault-and-load power-factor angle (lagging) \quad (29)

$e^{j\phi}=$ phase-rotational multiplier for causing a $\phi$-degree phase-advance of the voltage-winding response relatively to the current-winding response \quad (30)

In faults involving ground-fault resistance, and particularly in the case of single line-to-ground faults, or simply ground-faults, as indicated by the angle B, the ground resistance causes the fault-current to have a somewhat smaller angle of lag than if the grounding resistance were not present, as in the case of three-phase faults or the case of line-to-line faults, or simply phase-faults, as represented by the angle A. Typical values of the angles A and B are 60° and 45° respectively, although it will be understood that my invention is by no means limited to these particular values.

According to Equation 3 and Fig. 1, with the phase-rotational multipliers 14—15, the first and second wattmeter elements 7 and 8 jointly develop a total resultant torque in accordance with the real part of the equation $$W_{(3)}=3\sqrt{3}(\overline{P}e^{j(D+\phi-90°)}-\overline{N}e^{j[(A \text{ or } B)+\phi-90°]}) \quad (31)$$

For fault-currents only, D will be replaced by A or B, according to the nature of the fault, and the maximum wattmeter response will be obtained when $$(A \text{ or } B) + \phi - 90° = 0$$

giving $\quad \phi = 90° - (A \text{ or } B)$ ------------ (32)

Equation 32 indicates, therefore, that it is, or in some instances may be, desirable to adjust the phase-rotational multiplier $e^{j\phi}$ to have a value corresponding to the angle $\phi = (90° - A)$ or $(90° - B)$, according as it seems desirable to adjust for the best operation in response to phase-faults or ground-faults, under the particular operating conditions of the transmission-line under consideration. With average values of A and B, this would make the phase-rotational angle $\phi = 30°$ or $15°$ respectively; or allowing for a certain departure from optimum values, $\phi$ would vary from 0° to 75°, more or less.

It should be noted that $\phi$ is the phase-advance of the voltage-winding response relatively to the current-winding response, which means either that the applied voltage is advanced, or that the applied current is retarded, or both, so that the total relative phase-displacement introduced by the multiplier is equal to $\phi$.

With the combination shown in Fig. 1, as represented by Equations 3 and 31, it is also possible to adjust for a zero response to the normal power-flow load-currents or to the balanced line-currents which are obtained under out-of-step conditions, at any specified power-factor other than the fault-current power-factor. Under these conditions $$\overline{N} = O_1 \text{ and } D$$

Equation 29, will be replaced, in Equation 31, by $\theta$ or $C$, Equations 25 or 28, giving a response according to the real part of $$W_{L3} = 3\sqrt{3}\,\overline{P} e^{j[(\theta \text{ or } C) + \phi - 90°]}$$
$$= 3\sqrt{3}\,\overline{P} \cos[90° - (\theta \text{ or } C) - \phi] \text{------}(33)$$

This response may be made zero, regardless of the value of the line-current, by making $$90° - (\theta \text{ or } C) - \phi = 90°$$

or $$\phi = -\theta \text{ or } -C \text{------------}(34)$$

According to Equation 4 and Fig. 2, with the phase-rotation multipliers 34—35, the first and second wattmeter elements 27 and 28 jointly develop a total resultant torque in accordance with the real part of the equation.

$$W_{(4)} = 3(\overline{P} e^{j(D+\phi-120°)} - \overline{N} e^{j[(A \text{ or } B) + \phi - 60°]}) \text{---}(35)$$

When the load-current is negligible compared to the fault-current, D will be replaced by A or B, according to the nature of the fault, and the responses to $\overline{P}$ and $\overline{N}$ will be equal, but not quite in phase-opposition, when $$(A \text{ or } B) + \phi - 90° = 0$$

giving $$\phi = 90° - (A \text{ or } B) \text{----------}(36)$$

and $$W_F = 3(\overline{P} e^{-j30°} - \overline{N} e^{j30°})$$
$$= 3(\overline{P} \cos 30° - \overline{N} \cos 30°) = \frac{3}{2}(\overline{P} - \overline{N}) \text{---}(37)$$

With the combination shown in Fig. 2, as represented by Equations 4 and 35, it is also practical to obtain a negligibly small or zero wattmetric response to the normal power-flow load-currents or to the balanced line-currents which are obtained under out-of-step conditions, at any specified power-factor other than the fault-current power-factor. Under these conditions, $$\overline{N} = O \text{ and } D$$

Equation 29 will be replaced, in Equation 35, by $\theta$ or $C$, Equations 25 or 28, giving a response according to the real part of $$W_{L4} = 3\overline{P} e^{j[(\theta \text{ or } C) + \phi - 120°]}$$
$$= 3\overline{P} \cos[120° - (\theta \text{ or } C) - \phi] \text{----------}(38)$$

This response can be made zero, regardless of the value of the line-current, by making $$120° - (\theta \text{ or } C) - \phi = 90°$$

or $$\phi = 30° - (\phi \text{ or } C) \text{----------}(39)$$

It follows that a power-factor angle C (positive for lagging currents) may be chosen, for example, according to the load-conditions which would be the most likely to interfere with the proper directional response to super-imposed fault-currents. Thus, if $C = 0°$, corresponding to unity power-factor, $\phi = 30°$, or the phase-rotational multiplier will be $e^{j30°}$. If $C = 15°$, $\phi = 15°$.

It will be noted that the response shown in Equations 6 and 7 is frequently not as favorable as Equations 4 and 5 for suppressing the load-current response, as seen from the following equation, $$W_{L6} = 3\overline{P} \cos(60° - C - \phi) \text{------------------}(40)$$

which becomes zero when $$60° - C - \phi = 90°$$

or $$\phi = -30° - C \text{----------}(41)$$

According to Equation 8 and Fig. 3, no phase-rotational multiplier, such as $e^{j\phi}$, is needed in order to obtain a response to the real part of $$W_{(8)} = 3(\overline{P} e^{j\theta} + \overline{N} e^{j\theta}) = 3(\overline{E}_1 \overline{I}_1 \cos\theta + \overline{E}_2 \overline{I}_2 \cos\theta) \text{ (42)}$$

It will be noted that Equation 3 is equivalent to $$-E_C(\hat{I}_c - \hat{I}_b) - E_A(\hat{I}_a - \hat{I}_b)$$
$$= -E_C \hat{I}_c - E_A \hat{I}_a + (E_A + E_C)\hat{I}_b$$
$$= -(E_C \hat{I}_c + E_A \hat{I}_a + E_B \hat{I}_b) = -j3\sqrt{3}(P - N) \text{--}(43)$$

If this equation is compared to the ordinary equation for three-phase power, thus $$3(E_a \hat{I}_a + E_b \hat{I}_b + E_c \hat{I}_c) = 3(P + N + Z) \text{--------}(44)$$

it will be noted that one set of vectors, either currents or voltages, has been rotated through 90° in changing from Equation 44 to Equation 43, since $E_A$ leads $E_a$ by 90° under balanced conditions. This phase-rotation rotates the positive-sequence product $E_1 \hat{I}_1$ through 90°, as indicated by the operator $j = e^{j90°}$, while it rotates the negative-sequence product $E_2 \hat{I}_2$ through $-90°$, as indicated by the operator $-j = e^{-j90°}$. In general, any $x$-degree phase-rotation of either the voltage-vectors or the current-vectors, if achieved through polyphase transformation-means, will rotate the P-response through $+x$ degrees and will rotate the N-response through $-x$ degrees, giving a convenient vehicle for obtaining a response to $(P-N)$, if $x = 90°$, or, in general, a response to $$(P e^{jx} + N e^{-jx}) = (P e^{jx} - N e^{j(180°-x)})$$
$$= (P e^{-j(90°-x)} - N e^{j(90°-x)}) e^{j90°} \text{--}(45)$$

which is recognizable as the same response as in Equation 4, with $x = 60°$.

I have discovered—and it is one aspect of my present invention—that I am not limited to the well-known transformations or changes from one star-phase to another star-phase or to a delta-phase, or vice versa, in the choice of the means for energizing the respective coils of the watt-meter-elements. These so-called polyphase transformations, referred to in the last preceding paragraph, and illustrated in various equations, make it possible to rotate the positive-sequence "power" or product $E_1\hat{I}_1 = P$ through 30° steps in one direction, while rotating the negative-sequence "power" or product $E_2\hat{I}_2 = N$ the same amount in the opposite direction, resulting in a minimum change of 60° between the maximum P and N responses of the wattmeters.

I have made a new and important discovery—and have for the first time generally and accurately applied it to either power-measurement or fault-responsive protective relaying—namely, that any symmetrical linear transformation may be utilized, defining such a transformation as one which is represented by the substitution, for any set of vectors, such as $E_a$, $E_b$, $E_c$, a new set of vectors $E'_a$, $E'_b$, $E'_c$, as defined by $$\left.\begin{array}{l} E'_a = rE_a + sE_b + tE_c \\ E'_b = rE_b + sE_c + tE_a \\ E'_c = rE_c + sE_a + tE_b \end{array}\right\} \quad (46)$$

where $r$, $s$ and $t$ are real numbers, provided that the zero-sequence component is absent, or eliminated, from both $E_a$, $E_b$, $E_c$ and $E'_a$, $E'_b$, $E'_c$, and my discussions are to be understood with this proviso always in mind. From Equations 46, it follows that $$\left.\begin{array}{l} E'_1 = (r + sa^2 + ta)E_1 \\ \quad = \sqrt{r^2 + s^2 + t^2 - rs - rt - st}\, E_1 e^{ju} \\ E'_2 = (r + sa + ta^2)E_2 \\ \quad = \sqrt{r^2 + s^2 + t^2 - rs - rt - st}\, E_2 e^{-ju} \end{array}\right\} \quad (47)$$

where $$u = \tan^{-1}\left\{\frac{\tfrac{1}{2}\sqrt{3}(t-s)}{\tfrac{1}{2}(2r - s - t)}\right\} \quad (48)$$

In the case of conjugate vectors, such as $\hat{I}_a$, $\hat{I}_b$, $\hat{I}_c$, the general equations for a symmetrical linear transformation are $$\left.\begin{array}{l} \hat{I}'_a = r\hat{I}'_a + s\hat{I}'_b + t\hat{I}'_c \\ \hat{I}'_b = r\hat{I}'_b + s\hat{I}'_c + t\hat{I}'_a \\ \hat{I}'_c = r\hat{I}'_c + s\hat{I}'_a + t\hat{I}'_b \end{array}\right\} \quad (49)$$

yielding $$\left.\begin{array}{l} \hat{I}'_1 = (r + sa + ta^2)\hat{I}'_1 \\ \quad = \sqrt{r^2 + s^2 + t^2 - rs - rt - st}\, \hat{I}_1 e^{-ju} \\ \text{and} \\ \hat{I}'_2 = (r + sa^2 + ta)\hat{I}'_2 \\ \quad = \sqrt{r^2 + s^2 + t^2 - rs - rt - st}\, \hat{I}_2 e^{ju} \end{array}\right\} \quad (50)$$

In any equation representing a wattmetric response to three-phase quantities, the set of voltage-vectors, or the set of current-vectors, or both, may be transformed by substitution of the kind indicated in Equations 46 and 49, and the result of each such transformation will be the introduction of a transformation-ratio or amplification-factor of $$T = \sqrt{r^2 + s^2 + t^2 - rs - rt - st} \quad (51)$$

and the rotation of the positive-sequence and negative-sequence products $E_1\hat{I}_1$ and $E_2\hat{I}_2$ in opposite directions through the angle $u$, as defined in Equation 48. If, as previously pointed out, such a transformation is carried out with quantities having no zero-sequence component, it will not introduce any so-called "hybrid" products of a voltage of one phase-sequence with a current of another phase-sequence, when such hybrid products were absent in the original equation.

Figure 4:
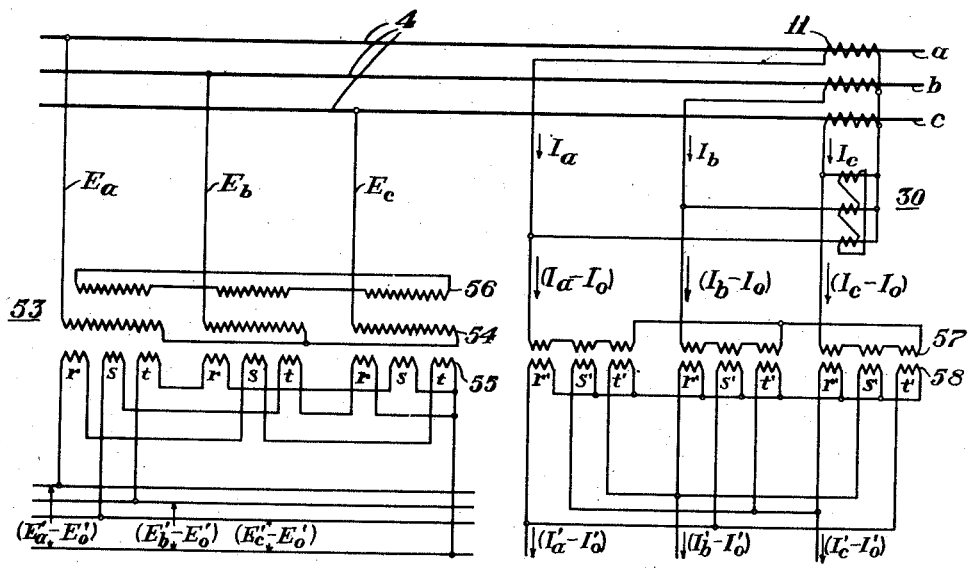
Fig. 4 is a diagrammatic view of circuits and apparatus illustrating a means for effecting a symmetrical linear transformation of both currents and voltages.

One form of embodiment of a physical means for making the transformations of Equations 46 and 49 is shown in Fig. 4, although I am not limited in this regard, as any device or mechanism which produces a transformation which may be represented by Equations 46 or 49 may be utilized. In Fig. 4, a three-phase line 4, having phases $a$, $b$ and $c$, is provided with a set of potential-transformers 53, and a set of line-current transformers 11. Each of the potential-transformers 53 is provided with a primary winding 54, three secondary windings 55 having the ratios $r$, $s$ and $t$, respectively, and a tertiary winding 56. The tertiary windings 56 are short-circuited in delta, to remove the zero-sequence voltage-component from the secondary windings 55. The three transformation-voltages $(E'_a - E'_0)$, $(E'_b - E'_0)$ and $(E'_c - E'_0)$ are each obtained by connecting three secondary windings 55 in series, in accordance with Equations 46.

The zero-sequence current-component is removed from the output of the line-current transformers 11 by the filter 30, and the resultant currents $(I_a - I_0)$, $(I_b - I_0)$ and $(I_c - I_0)$ are then supplied to three sets of auxiliary current-transformers, one set per phase, each set comprising three current-transformers having serially connected primary windings 57, and separately connected secondary windings 58 having the ratios $r'$, $s'$ and $t'$, respectively. The three transformation-currents $(I'_a - I'_0)$, $(I'_b - I'_0)$ and $(I'_c - I'_0)$ are each obtained by connecting three secondary windings 58 in parallel, in accordance with Equations 49.

It will be noted that the transformation-equations are perfectly general, so that the three ratios $r$, $s$ and $t$ may each have any value whatever, and may be either plus or minus, having reference to the polarity of the respective secondary-terminals. It will usually be convenient to make at least one of the ratios $r$, $s$ and $t$ zero, meaning that the corresponding secondary-winding 55 or the corresponding current-transformer 57—58 will be omitted. It will also usually be convenient to utilize a standard transformer having a conventional ratio, such as unity, (or its equivalent), for at least one of the factors $r$, $s$ and $t$. The particular case where $r = 1$, and $s = t = 0$ is a special case representing the particular conditions in the original equation, before the transformation was made. The substitution of a delta quantity for a star quantity is a special case represented, for example, by making $r = 0$, $s = -1$, and $t = 1$.

Figure 5:
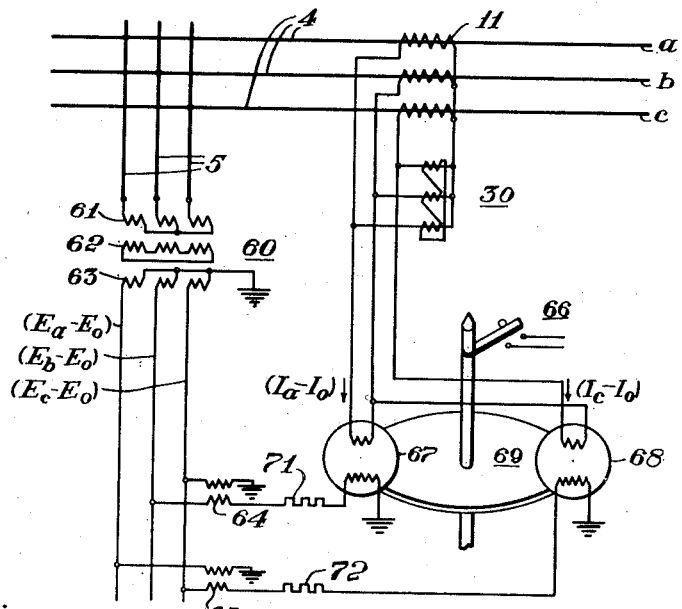
Fig. 5 is a view similar to Fig. 2, illustrating the application of a voltage-transformation.

By way of illustration, I show, in Fig. 5, the application of the transformation represented by Equations 46 and 47 to the form of my invention which is set forth in Equation 22. This Equation 22 gives the same kind of response as Equation 3, which has been discussed at considerable length in connection with Fig. 1, the wattmetric responses, before the transformation, being, except for the multiplier $\sqrt{3}$, in accordance with the real parts of Equations 31 and 33. The transformation effected by the substitution of the new set of vectors as defined in Equation 46 introduces the amplifier $T$, Equation 51, and the phase-angle shift $u$, Equations 47 and 48, into the response of original Equation 22. The transformation consists in substituting $(E'_a - E'_0)$ and $(E'_c-E'_0)$, from Equations 46, for $(E_a-E_0)$ and $(E_c-E_0)$, respectively, in Equation 22, yielding $$-(E'_c-E'_0)(\hat{I}_a-\hat{I}_0)+(E'_a-E'_0)(\hat{I}_c-\hat{I}_0)$$
$$=\sqrt{3}T(E_1\hat{I}_1e^{ju}-E_2\hat{I}_2e^{-ju})e^{-j90°}$$
$$=\sqrt{3}T(\overline{P}e^{j(D+\phi+u-90°)}$$
$$-\overline{N}e^{j[(A \text{ or } B)+\phi-u-90°]}) \quad (52)$$

In Equation 52, the fault-current response, at a power-factor angle A, is in accordance with the real part of $$W'_F=\sqrt{3}T(\overline{P}e^{j(A+\phi+u-90°)}-\overline{N}e^{j(A+\phi-u-90°)})$$
$$=\sqrt{3}T[\overline{P}\cos(90°-A-\phi-u)$$
$$-\overline{N}\cos(90°-A-\phi+u)] \quad (53)$$

and the balanced line-current response, at the power-factor angle C, is in accordance with the real part of $$W'_L=\sqrt{3}T\overline{P}e^{j(C+\phi+u-90°)}$$
$$=\sqrt{3}T\overline{P}\cos(90°-C-\phi-u) \quad (54)$$

I shall assume, as an example of the calculation, that the operating engineers in charge of a transmission line-section on which my invention is to be applied, have decided that it will be the most advantageous to make the positive-sequence response to P equal to zero at a line-current phase-angle of 15° lagging, or C=15°, and to make the negative-sequence response to $\overline{N}$ a maximum at a fault-current phase-angle of 55° lagging, or A=55°. These requirements will be satisfied, in Equation 54 and in the last term of Equation 53, respectively, by putting $$90°-15°-\phi-u=0 \text{ or } \pm 180° \quad (55)$$

and $$90°-55°-\phi+u=\pm 90° \quad (56)$$

Among the possible solutions of Equations 55 and 56, I choose, by way of example, a phase-advancer angle of $$\phi=10° \quad (57)$$

and a transformation phase-shift of $$u=65° \quad (58)$$

From Equations 48 and 53, $$\tan 65°=2.1445=1.732\left(\frac{t-s}{2r-s-t}\right) \quad (59)$$

Assuming, for example, that $s=0$, (to avoid the necessity for one extra transformer), and that $t=1$, (representing a standard, unity-ratio transformer, which can be omitted), then, from Equation 59, it follows that $r=0.904$. Substituting these values of $r$, $s$ and $t$ in Equations 46 and 52, I obtain $$(E'_c-E'_0)=0.904(E_c-E_0)+(E_b-E_0) \quad (60)$$
$$(E'_a-E_0)=0.904(E_a-E_0)+(E_c-E_0) \quad (61)$$
$$-[0.904(E_c-E_0)+(E_b-E_0)](\hat{I}_a-\hat{I}_0)$$
$$+[0.904(E_a-E_0)+(E_c-E_0)](\hat{I}_c-\hat{I}_0)$$
$$=1.518(E_1\hat{I}_1e^{j65°}-E_2\hat{I}_2e^{-j65°})e^{-j90°}$$
$$=E_1\hat{I}_1(1.5-j0.699)+E_2\hat{I}_2(1.5+j0.699) \quad (62)$$

Fig. 5 represents an illustrative form of embodiment of apparatus for satisfying Equation 62, with a voltage-phase advancer of $e^{j10°}$ in accordance with Equation 57. The protected three-phase line-section 4 is connected to a bus 5, from which is energized a bank of potential-transformers 60 having Y-connected primaries 61, closed-delta tertiaries 62, and Y-connected secondaries 63, producing the relaying voltages $(E_a-E_0)$, $(E_b-E_0)$ and $(E_c-E_0)$. Two auxiliary transformers 64 and 65 are utilized to produce the voltages $0.904(E_c-E_0)$ and $0.904(E_a-E_0)$. The wattmeter 66 is illustrated as comprising two elements 67 and 68 operating on a single disc 69, as in Fig. 2. The voltage-coils of the watt-meter elements 67 and 68 are energized, respectively, with the voltages $$[E_b-E_0)+0.904(E_c-E_0)] \text{ and}$$
$$[(E_c-E^0)+0.904(E_a-E^0)],$$

through resistors 71 and 72, respectively, which serve as 10-degree phase-advancers $e^{j10°}$. The two current-coils are energized, respectively, with the currents $(I_a-I_0)$ and $(I_c-I_0)$ from the line-current transformers 11 and the zero-sequence filter 30.

In the foregoing discussions, I have indicated certain optimum adjustments whereby I can suppress the positive-sequence load-current wattmetric response by a proper choice of phase-angle for the wattmeter, or whereby I can obtain a maximum or optimum response to a predetermined function of the positive and negative phase-sequence powers P and N. It will be understood that these optimum values are not by any means binding, as a fairly large angular deviation therefrom will frequently not be at all objectionable. Thus, if, instead of a maximum response corresponding to $\cos 0°=1.00$, it is permissible to utilize a response which is weaker by 20%, more or less, a phase-angle variation of $\cos^{-1} 0.80=37°$ may be tolerated, more or less, in either direction from the optimum value. In like manner, if, instead of a null-reading response corresponding to $\cos 90°=0$, it is permissible to have a 20% response to the quantity in question, a phase-angle variation of $$(90°-\cos^{-1} 0.20)=12°$$

may be tolerated, more or less, in either direction from the optimum value.

In view of the various substitutions and adaptations such as those which have been hereinabove indicated, and other changes which will be obvious to those skilled in the art, I wish it to be understood that my several illustrations, in the drawings, are to be taken by way of example rather than by way of absolute limitation, and I desire that the appended claims shall be accorded the broadest construction consistent with their language and the prior art.

I claim as my invention:

1. A polyphase wattmeter mechanism for obtaining a predetermined response in a three-phase line which is subject, at times, to zero-phase-sequence currents and voltages, said wattmeter mechanism comprising two wattmeter elements for obtaining said predetermined response with the two elements alone, said wattmeter elements being operative on a common movable member, each of said wattmeter elements comprising a voltage-responsive winding and a cooperating current-responsive winding, in combination with means for producing substantially the effect of energizing said voltage-responsive windings with differential responses to two different pairs of line-derived voltage-responsive quantities, and means for producing substantially the effect of energizing said current-responsive windings with differential responses to two different pairs of line-derived current-responsive quantities, the several pairs of voltage- and current-responsive quantities being so chosen that the algebraic sum of the responses of said two wattmeter elements is a predetermined function of the real parts of quanties containing $E_1\hat{I}_1$ and $E_2\hat{I}_2$, and to substantially eliminate responses to all other products of the various phase-sequence voltages $E_1$, $E_2$, $E_0$ with the various phase-sequence currents $I_1$, $I_2$, $I_0$, where the subscripts 1, 2, and 0 respectively indicate the positive, negative, and zero phase-sequences, and the circumflex accent indicates conjugate vectors.

2. A polyphase wattmeter mechanism for obtaining a predetermined response in a three-phase line which is subject, at times, to zero-phase-sequence currents and voltages, said wattmeter mechanism comprising two wattmeter elements for obtaining said predetermined response with the two elements alone, each of said wattmeter elements comprising a voltage-responsive winding and a cooperating current-responsive winding, in combination with means for so deriving two different voltage-responsive quantities from different phases of a set of polyphase voltages of the line as to have substantially no zero-phase-sequence voltage-component in said derived voltage-responsive quantities, means for so deriving two different current-responsive quantities from different phases of a set of polyphase currents of the line as to have substantially no zero-phase sequence current-component in said derived current-responsive quantities, and circuit-means for energizing the two voltage-responsive windings and the two current-responsive windings of the two wattmeter elements from said derived voltage- and current-responsive quantities, respectively, said derived current- and voltage-responsive quantities being so chosen that the algebraic sum of the responses of said two wattmeter elements is a predetermined function of the real parts of quantities containing $E_1\hat{I}_1$ and $E_2\hat{I}_2$, and to substantially eliminate responses to $E_1\hat{I}_2$ and $E_2\hat{I}_1$, where $E_1$ and $E_2$ respectively represent positive and negative phase-sequence components of a set of polyphase voltages of the line, and $\hat{I}_1$ and $\hat{I}_2$ respectively represent the conjugate vectors of positive and negative phase-sequence components of a set of polyphase currents of the line.

3. A polyphase wattmeter mechanism for obtaining a predetermined response in a three-phase line, said wattmeter mechanism comprising two wattmeter elements for obtaining said predetermined response with the two elements alone, said wattmeter elements being operative on a common movable member, each of said wattmeter elements comprising a voltage-responsive winding and a cooperating current-responsive winding, in combination with means associated respectively with different phases of a set of polyphase voltages of the line and with different phases of a set of polyphase currents of the line for obtaining a plurality of derived voltage-responsive quantities and a plurality of derived current-responsive quantities having therein substantially no zero-phase-sequence components of voltages or currents under the operating conditions under which the wattmeter mechanism is required to be responsive, said derived voltage- and current-responsive quantities comprising a first derived voltage-responsive quantity having a predetermined phase, a second derived voltage-responsive quantity which lags said first derived voltage-responsive quantity by 120° under balanced positive-phase-sequence line-conditions, a first derived current-responsive quantity which lags said first derived voltage-responsive quantity by 120° under balanced positive-phase-sequence line-conditions at unity power-factor, and a second derived current-responsive quantity which is in phase with said first derived voltage-responsive quantity under balanced positive-phase-sequence line-conditions at unity power-factor; circuit-means for energizing the voltage- and current-responsive windings of a first wattmeter element responsively to said first derived voltage-responsive quantity and said first derived current-responsive quantity, respectively; and circuit-means for energizing the voltage- and current-responsive windings of a second wattmeter element responsively to said second derived voltage-responsive quantity and said second derived current-responsive quantity, respectively, the relative connections of either the voltage-responsive winding or the current-responsive winding of said second wattmeter element being reversed with respect to the connections in the first wattmeter element.

4. A polyphase wattmeter mechanism for obtaining a predetermined response in a three-phase line, said wattmeter mechanism comprising two wattmeter elements for obtaining said predetermined response with the two elements alone, said wattmeter elements being operative on a common movable member, each of said wattmeter elements comprising a voltage-responsive winding and a cooperating current-responsive winding, in combination with means associated respectively with different phases of a set of polyphase voltages of the line and with different phases of a set of polyphase currents of the line for obtaining a plurality of derived voltage-responsive quantities and a plurality of derived current-responsive quantities having therein substantially no zero-phase-sequence components of voltages or currents under the operating conditions under which the wattmeter mechanism is required to be responsive, said derived voltage- and current-responsive quantities comprising a first derived voltage-responsive quantity and a first derived current-responsive quantity which are 90°-related under balanced positive-phase-sequence line-conditions at unity power-factor, one of said first derived quantities being a phase of a star system of polyphase vectors and the other being a phase of a delta system of polyphase vectors, a second derived voltage-responsive quantity which is the next phase-quantity in one direction of progression around the system of polyphase vectors including the first derived voltage-responsive quantity, and a second derived current-responsive quantity which is the next phase-quantity in the other direction of progression around the system of polyphase vectors including the first derived current-responsive quantity; circuit-means for energizing the voltage- and current-responsive windings of a first wattmeter element responsively to said first derived voltage-responsive quantity and said first derived current-responsive quantity, respectively; and circuit-means for energizing the voltage- and current-responsive windings of a second wattmeter element responsively to said second derived voltage-responsive quantity and said second derived current-responsive quantity, respectively, the relative connections of either the voltage-responsive winding or the current-responsive winding of said second wattmeter element being reversed with respect to the connections in the first wattmeter element.

5. A polyphase wattmeter mechanism for obtaining a predetermined responsive in a three-phase line, said wattmeter mechanism comprising two wattmeter elements for obtaining said predetermined response with the two elements alone, said wattmeter elements being operative on a common movable member, each of said wattmeter elements comprising a voltage-responsive winding and a cooperating current-responsive winding, in combination with means associated respectively with different phases of a set of polyphase voltages of the line and with different phases of a set of polyphase currents of the line for obtaining a plurality of derived voltage-responsive quantities and a plurality of derived current-responsive quantities having therein substantially no zero-phase-sequence components of voltages or currents under the operating conditions under which the wattmeter mechanism is required to be responsive, and circuit-means for energizing the two voltage-responsive windings and the two-current-responsive windings of the two wattmeter elements from said derived voltage- and current-responsive quantities, respectively, said derived current- and voltage-responsive quantities being so chosen that the algebraic sum of the responses of said two wattmeter elements is a predetermined function of the real parts of quantities containing $E_1\hat{I}_1$ and $E_2\hat{I}_2$, and to substantially eliminate responses to $E_1\hat{I}_2$, and $E_2\hat{I}_1$, where $E_1$ and $E_2$ respectively represent positive and negative phase-sequence components of a set of polyphase voltages of the line, and $\hat{I}_1$ and $\hat{I}_2$ respectively represent the conjugate vectors of positive and negative phase-sequence components of a set of polyphase currents of the line.

6. A wattmeter mechanism, as defined in claim 3, for determining fault-current direction in a protected three-phase line, in combination with a phase-rotational multiplier associated with each of the aforesaid wattmeter elements for causing a phase-advance of the voltage-winding response relatively to the current-winding response, said phase-advance being approximately within the range from 0° to 70°.

7. A wattmeter mechanism, as defined in claim 3, for determining fault-current direction in a protected three-phase line, in combination with a phase-rotational multiplier associated with each of the aforesaid wattmeter elements for causing a phase-advance of the voltage-winding response relatively to the current-winding response, said phase-advance being of the order of (90°—A), where A is the approximate angle of lag of the three-phase and line-to-line fault currents on the protected line.

8. A wattmeter mechanism, as defined in claim 3, for determining fault-current direction in a protected three-phase line, in combination with a phase-rotational multiplier associated with each of the aforesaid wattmeter elements for causing a phase-advance of the voltage-winding response relatively to the current-winding response, said phase-advance being of the order of 30°.

9. A wattmeter mechanism, as defined in claim 3, for determining fault-current direction in a protected three-phase line, in combination with a phase-rotational multiplier associated with each of the aforesaid wattmeter elements for causing a phase-advance of the voltage-winding response relatively to the current-winding response, said phase-advance being of the order of (90°—B), where B is the approximate angle of lag of the single-phase line-to-ground fault-currents on the protected line.

10. A wattmeter mechanism, as defined in claim 3, for determining fault-current direction in a protected three-phase line, in combination with a phase-rotational multiplier associated with each of the aforesaid wattmeter elements for causing a phase-advance of the voltage-winding response relatively to the current-winding response, said phase-advance being of the order of 45°.

11. Directional relaying means for determining fault-direction in a three-phase line which is subject, at times, to zero-phase-sequence currents and voltages, said directional relaying means comprising a plurality of wattmeter elements operative on a common movable member, each of said wattmeter elements comprising a voltage-responsive winding and a cooperating current-responsive winding, in combination with means associated respectively with different phases of a set of polyphase voltages of the line and with different phases of a set of polyphase currents of the line for obtaining a plurality of derived voltage-responsive quantities and a plurality of derived current-responsive quantities having therein substantially no zero-phase-sequence components of voltage or currents under the operating conditions under which the wattmeter mechanism is required to be responsive, said derived voltage- and current-responsive quantities comprising a first derived voltage-responsive quantity having a predetermined phase, a second derived voltage-responsive quantity which lags said first derived voltage-responsive quantity by 120° under balanced positive-phase-sequence line-conditions, a first derived current-responsive quantity which lags said first derived voltage-responsive quantity by 120° under balanced positive-phase-sequence line-conditions at unity power-factor, and a second derived current-responsive quantity which is in phase with said first derived voltage-responsive quantity under balanced positive-phase-sequence line-conditions at unity power-factor; circuit-means for energizing the voltage- and current-responsive windings of a first wattmeter element responsively to said first derived voltage-responsive quantity and said first derived current-responsive quantity, respectively; circuit-means for energizing the voltage- and current-responsive windings of a second wattmeter element responsively to said second derived voltage-responsive quantity and said second derived current-responsive quantity, respectively, the relative connections of either the voltage-responsive winding or the current-responsive winding of said second wattmeter element being reversed with respect to the connections in the first wattmeter element; and circuit-means for energizing the voltage- and current-responsive windings of a third wattmeter element responsively to the zero-phase-sequence components of the line-current and the line-voltage, respectively, the relative connections of the voltage- and current-responsive windings of said third wattmeter element being such that said element responds in a predetermined manner to $-E_0\hat{I}_0$ while the aforesaid first and second wattmeter elements jointly respond in a predetermined manner to $(E_1\hat{I}_1-E_2\hat{I}_2)$ under fault-conditions, where $E_1$, $E_2$ and $E_0$ respectively represent positive, negative, and zero phase-sequence voltages of the line, and $\hat{I}_1$, $\hat{I}_2$ and $\hat{I}_0$ respectively represent the conjugate vectors of positive, negative, and zero phase-sequence currents of the line.

12. A wattmeter mechanism, as defined in claim 3, for determining fault-current direction in a protected three-phase line, in combination with means for normally imposing a restraint against the operation of said directional relaying mechanism and for reducing said restraint in response to a fault-condition in the line.

13. The invention as defined in claim 11, in combination with means for normally imposing a restraint against the operation of said directional relaying means and for reducing said restraint in response to a fault-condition in the line.

14. The invention as defined in claim 1, characterized by said pairs of line-derived voltage-responsive quantities being pairs of different phases of a polyphase system of a predetermined nature, and said pairs of line-derived current-responsive quantities being pairs of different phases of a similar polyphase system.

15. The invention as defined in claim 1, characterized by said line-derived voltage- and current-responsive quantities being different phases of star voltage- and current-responsive quantities, respectively.

16. Directional relaying means for determining fault-direction in a three-phase line having line-currents $I_a$, $I_b$, $I_c$, and corresponding star-voltages $E_a$, $E_b$, $E_c$, where phase-$b$ is indicated by the $b$-subscripts and lags behind phase-$a$ as indicated by the $a$-subscripts, said directional means comprising at least two wattmeter elements operative on a common movable element, each of said wattmeter elements comprising a voltage-responsive winding and a cooperating current-responsive winding, means for energizing the voltage-responsive winding of a first one of said wattmeter elements responsively to $\mp(E_b - E_a)$, means for energizing the current-responsive winding of said first wattmeter element responsively to $\pm(I_b - I_c)$, means for energizing the voltage-responsive winding of a second one of said wattmeter elements responsively to $\pm(E_b - E_c)$, and means for energizing the current-responsive winding of said second wattmeter element responsively to $\pm(I_b - I_a)$.

17. A polyphase wattmeter mechanism for obtaining a predetermined response in a three-phase line, said wattmeter mechanism comprising two wattmeter elements for obtaining said predetermined response with the two elements alone, said wattmeter elements being operative on a common movable member, each of said wattmeter elements comprising a voltage-responsive winding and a cooperating current-responsive winding, in combination with polyphase transformation-means associated respectively with different phases of a set of polyphase voltages of the line and with different phases of a set of polyphase currents of the line for obtaining a plurality of different phase-quantities of a set of polyphase line-derived voltage-responsive quantities and a plurality of different phase-quantities of a set of polyphase quadrature-related line-derived current-responsive quantities, the term quadrature-related designating that corresponding voltage-responsive phase-quantities and current-responsive phase-quantities are displaced in phase by approximately 90° under balanced positive-phase-sequence line-conditions at unity power-factor, circuit-means for energizing a winding of a first wattmeter element and the corresponding winding of a second wattmeter element respectively with two different phase-quantities of one of said sets of polyphase line-derived quantities, and circuit-means for energizing the other windings of the two wattmeter elements respectively with the differences obtained by subtracting the third phase-quantity from the respective quadrature-related phase-quantities of the other set of polyphase line-derived quantities, the line-derived quantities, as applied to said voltage- and current-responsive windings, having substantially no zero-phase-sequence components of voltages or currents under the operating conditions under which the wattmeter mechanism is required to be operative.

18. A polyphase wattmeter mechanism for obtaining a predetermined response in a three-phase line, said wattmeter mechanism comprising two wattmeter elements for obtaining said predetermined response with the two elements alone, said wattmeter elements being operative on a common movable member, each of said wattmeter elements comprising a voltage-responsive winding and a cooperating current-responsive winding, in combination with polyphase transformation-means associated respectively with different phases of a set of polyphase voltages of the line and with different phases of a set of polyphase currents of the line for obtaining a plurality of different phase-quantities of a set of polyphase line-derived voltage-responsive quantities and a plurality of different phase-quantities of a set of polyphase angularly-related line-derived current-responsive quantities, the term angularly-related designating that corresponding voltage-responsive phase-quantities and current-responsive phase-quantities are displaced in phase by a predetermined phase-angle under balanced positive-phase-sequence line-conditions at unity power-factor, circuit-means for energizing a winding of a first wattmeter element and the corresponding winding of a second wattmeter element respectively with two different phase-quantities of one of said sets of polyphase line-derived quantities, and circuit-means for energizing the other windings of the two wattmeter elements respectively with the differences obtained by subtracting the third phase-quantity from the respective angularly-related phase-quantities of the other set of polyphase line-derived quantities, the line-derived quantities, as applied to said voltage- and current-responsive windings, having substantially no zero-phase-sequence components of voltages or currents under the operating conditions under which the wattmeter mechanism is required to be operative.

19. A polyphase wattmeter mechanism for obtaining a predetermined response in a three-phase line, said wattmeter mechanism comprising two wattmeter elements for obtaining said predetermined response with the two elements alone, said wattmeter elements being operative on a common movable member, each of said wattmeter elements comprising a voltage-responsive winding and a cooperating-current-responsive winding, in combination with polyphase transformation-means associated respectively with different phases of a set of polyphase voltages of the line and with different phases of a set of polyphase currents of the line for obtaining a plurality of different phase-quantities of a set of polyphase line-derived voltage-responsive quantities and a plurality of different phase-quantities of a set of polyphase angularly-related line-derived current-responsive quantities, the term angularly-related designating that corresponding voltage-responsive phase-quantities and current-responsive phase-quantities are displaced in phase by a predetermined phase-angle other than 90° under balanced positive-phase-sequence line-conditions at unity power-factor, circuit-means for energizing a winding of a first wattmeter element and the corresponding winding of a second wattmeter element respectively with two different phase-quantities of one of said sets of polyphase line-derived quantities, and circuit-means for energizing the other windings of the two wattmeter elements respectively with the differences obtained by subtracting the third phase-quantity from the respective angularly-related phase-quantities of the other set of polyphase line-derived quantities, the line-derived quantities, as applied to said voltage- and current-responsive windings, having substantially no zero-phase-sequence components of voltages or currents under the operating conditions under which the wattmeter mechanism is required to be operative, said predetermined phase-angle being such as to produce, under the operating conditions of the wattmeter mechanism, a relatively feeble wattmetric response to $E_1\hat{I}_1$ at a line-current power-factor angle under a fault-free line-condition which is among the line-conditions the most likely to cause incorrect fault-directional response when a fault-condition is superimposed on the line, and relatively strong wattmetric responses to both $E_1\hat{I}_1$ and $-E_2\hat{I}_2$ at a power-factor angle of fault-currents in the line, where $E_1$ and $E_2$ respectively represent positive and negative phase-sequence components of a set of polyphase voltages of the line, and $\hat{I}_1$ and $\hat{I}_2$ respectively represent the conjugate vectors of positive and negative phase-sequence components of a set of polyphase currents of the line.

20. A wattmeter mechanism, as defined in claim 4, for determining fault-current direction in a protected three-phase line, in combination with a phase-rotational multiplier associated with each of the aforesaid wattmeter elements for causing a phase-advance of the voltage-winding response relatively to the current-winding response, said phase-advance being of the order of (90°—A), where A is the approximate angle of lag of the three-phase and line-to-line fault-currents on the protected line.

21. A wattmeter mechanism, as defined in claim 4, for determining fault-current direction in a protected three-phase line, in combination with a phase-rotational multiplier associated with each of the aforesaid wattmeter elements for causing a phase-advance of the voltage-winding response relatively to the current-winding response, said phase-advance being of the order of 30°.

22. A wattmeter mechanism, as defined in claim 4, for determining fault-current direction in a protected three-phase line, characterized by said second derived voltage-responsive quantity being the next lagging phase-quantity of the same system as the first derived voltage-responsive quantity, and said second derived current-responsive quantity being the next leading phase-quantity of the same system as the first derived current-responsive quantity.

23. A wattmeter mechanism, as defined in claim 4, for determining fault-current direction in a protected three-phase line, characterized by said second derived voltage-responsive quantity being the next lagging phase-quantity of the same system as the first derived voltage-responsive quantity, and said second derived current-responsive quantity being the next leading phase-quantity of the same system as the first derived current-responsive quantity; in combination with a phase-rotational multiplier associated with each of the aforesaid wattmeter elements for causing a phase-advance of the voltage-winding response relatively to the current-winding response, said phase-advance being of the order of (30°—C), where C is the power-factor angle of the line-current under a fault-free line-condition which is among the line-conditions the most likely to cause incorrect fault-directional response when a fault-condition is superimposed on the line, C being regarded as positive for lagging power-factors and as negative, reversing its sign, for leading power-factors.

24. Directional relaying means for determining fault-direction in a three-phase line which is subject, at times, to zero-phase-sequence currents and voltages, said directional relaying means comprising a plurality of wattmeter elements operative on a common movable member, each of said wattmeter elements comprising a voltage-responsive winding and a cooperating current-responsive winding, in combination with means associated respectively with different phases of a set of polyphase voltages of the line and with different phases of a set of polyphase currents of the line for obtaining a plurality of derived voltage-responsive quantities and a plurality of derived current-responsive quantities having therein substantially no zero-phase-sequence components of voltages or currents under the operating conditions under which the wattmeter mechanism is required to be responsive, said derived voltage- and current-responsive quantities comprising a first derived voltage-responsive quantity and a first derived current-responsive quantity which are 90°-related under balanced positive-phase sequence line-conditions at unity power-factor, one of said first derived quantities being a phase of a star system of polyphase vectors and the other being a phase of a delta system of polyphase vectors, a second derived voltage-responsive quantity which is the next lagging phase-quantity of the same system as the first derived voltage-responsive quantity, and a second derived current-responsive quantity which is the next leading phase-quantity of the same system as the first derived current-responsive quantity; circuit-means for energizing the voltage- and current-responsive windings of a first wattmeter element responsively to said first derived voltage-responsive quantity and said first derived current-responsive quantity, respectively; circuit-means for energizing the voltage- and current-responsive windings of a second wattmeter element responsively to said second derived voltage-responsive quantity and said second derived current-responsive quantity, respectively, the relative connections of either the voltage-responsive winding or the current-responsive winding of said second wattmeter element being reversed with respect to the connections in the first wattmeter element; and circuit-means for energizing the voltage- and current-responsive windings of a third wattmeter element responsively to the zero-phase-sequence components of the line-current and the line-voltage, respectively, the relative connections of the voltage- and current-responsive windings of said third wattmeter element being such that said element responds in a predetermined manner to $-E_0\hat{I}_0$ while the aforesaid first and second wattmeter elements jointly respond in a predetermined manner or manners to $E_1\hat{I}_1$ and $-E_2\hat{I}_2$ under fault-conditions where $E_1$, $E_2$, and $E_0$ respectively represent positive, negative, and zero phase-sequence voltages of the line, and $\hat{I}_1$, $\hat{I}_2$ and $\hat{I}_0$ respectively represent the conjugate vectors of positive, negative, and zero phase-sequence currents of the line.

25. The invention as defined in claim 4, in combination with means for normally imposing a restraint against the operation of said directional relaying means and for reducing said restraint in response to a fault-condition in the line.

26. The invention as defined in claim 24, in combination with means for normally imposing a restraint against the operation of said directional relaying means and for reducing said restraint in response to a fault-condition in the line.

27. A wattmeter mechanism, as defined in claim 4, for determining fault-current direction in a protected three-phase line which is subject, at times, to zero-phase-sequence currents and voltages, characterized by negative-phase-sequence absorbing-means associated with the star-system means for subtracting the negative-phase-sequence components therefrom.

28. A polyphase wattmeter mechanism, as defined in claim 5, for a line which is subject, at times, to zero-phase-sequence currents and voltages, characterized by negative-phase-sequence absorbing-means associated with the star-system means for subtracting the negative-phase-sequence components therefrom.

29. A polyphase wattmeter mechanism for obtaining a predetermined response in a three-phase line, said wattmeter mechanism comprising a plurality of wattmeter elements operative on a common movable member, each of said wattmeter elements comprising a voltage-responsive winding and a cooperating current-responsive winding, in combination with polyphase transformation-means associated respectively with a set of polyphase voltages of the line and a set of polyphase currents of the line for obtaining a set of three-phase line-derived voltage-responsive quantities and a set of three-phase quadrature-related line-derived current-responsive quantities, the term quadrature-related designating that corresponding phases of the voltage-responsive quantities and current-responsive quantities are displaced in phase by approximately 90° under balanced positive-phase-sequence line-conditions at unity power-factor, circuit-means for energizing the respective voltage-responsive windings of said wattmeter elements with different phases of said line-derived voltage-responsive quantities, circuit-means for energizing the respective cooperating current-responsive windings of said wattmeter elements with different phases of said line-derived current-responsive quantities, the line-derived quantities, as applied to said voltage- and current-responsive windings, having substantially no zero-phase-sequence components of voltages or currents under the operating conditions under which the wattmeter mechanism is required to be operative, and relay-contact means responsive to the movement of said common movable member.

30. A polyphase wattmeter mechanism for obtaining a predetermined response in a three-phase line, said wattmeter mechanism comprising a plurality of wattmeter elements operative on a common movable member, each of said wattmeter elements comprising a voltage-responsive winding and a cooperating current-responsive winding, in combination with polyphase transformation-means associated respectively with a set of polyphase voltages on the line and a set of polyphase currents of the line for obtaining a set of three-phase line-derived voltage-responsive quantities and a set of three-phase angularly-related line-derived current-responsive quantities, the term angularly-related designating that corresponding phases of the voltage-responsive quantities and current-responsive quantities are displaced in phase by a predetermined phase-angle under balanced positive-phase-sequence line-conditions at unity power-factor, circuit means for energizing the respective voltage-responsive windings of said wattmeter elements with different phases of said line-derived voltage-responsive quantities, circuit-means for energizing the respective cooperating current-responsive windings of said wattmeter elements with different phases of said line-derived current-responsive quantities, the line-derived quantities, as applied to said voltage- and current-responsive windings, having substantially no zero-phase-sequence components of voltages or currents under the operating conditions under which the wattmeter mechanism is required to be operative, and relay-contact means responsive to the movement of said common movable member.

31. The invention as defined in claim 29, in combination with means for normally imposing a restraint against the operation of said directional relaying mechanism and for reducing said restraint in response to a fault-condition in the line.

32. The invention as defined in claim 30, in combination with means for normally imposing a restraint against the operation of said directional relaying mechanism and for reducing said restraint in response to a fault-condition in the line.

33. In a fault-protective relaying system for a three-phase line, a directional wattmetric relaying element so energized as to be responsive to different functions of $E_1\hat{I}_1$, and $E_2\hat{I}_2$, and to substantially eliminate responses to $E_1\hat{I}_2$, $E_2\hat{I}_1$, $E_0$ and $\hat{I}_0$, where $E_1$, $E_2$ and $E_0$ respectively represent positive, negative and zero phase-sequence components of a set of polyphase voltages of the line, and $\hat{I}_1$, $\hat{I}_2$ and $\hat{I}_0$ respectively represent positive, negative and zero phase-sequence components of a set of polyphase currents of the line, in combination with two separate phase-angle response adjustment-means whereby the power-factor angles of maximum or zero wattmetric responses to $E_1\hat{I}_1$ and $E_2\hat{I}_2$ may be separately adjusted to any two different predetermined values.

34. In a fault-protective relaying system for a three-phase line, a directional wattmetric relaying element comprising a plurality of torque-producing elements operative upon a common movable member, in combination with means associated respectively with different phases of a set of polyphase voltages of the line and with different phases of a set of polyphase currents of the line for obtaining a plurality of derived voltage-responsive quantities and a plurality of derived current-responsive quantities, said derived voltage- and current-responsive quantities each containing a response to any positive- and negative-phase-sequence quantities which may be present in the respective sets of polyphase voltages and currents of the line but containing substantially no zero-phase-sequence component under the operating conditions under which the wattmetric relaying element is required to be responsive, means for energizing said torque-producing elements from said derived voltage- and current-responsive quantities, said derived voltage- and current-responsive quantities being so chosen as to cause said wattmetric relaying element to be responsive to different functions of $E_1\hat{I}_1$ and $E_2\hat{I}_2$, and to substantially eliminate responses to $E_1\hat{I}_2$, $E_2\hat{I}_1$, $E_0$ and $\hat{I}_0$, where $E_1$, $E_2$ and $E_0$ respectively represent positive, negative and zero phase-sequence components of a set of polyphase voltages of the line, and $\hat{I}_1$, $\hat{I}_2$ and $\hat{I}_0$ respectively represent positive, negative and zero phase-sequence components of a set of polyphase currents of the line, and two separate phase-angle-response adjustment-means whereby the power-factor angles of maximum or zero wattmetric responses to $E_1\hat{I}_1$ and $E_2\hat{I}_2$ may be separately adjusted to any two different predetermined values.

35. In a fault-protective relaying system for a three-phase line, a directional wattmetric relaying element comprising a plurality of torque-producing elements operative upon a common movable member, in combination with means associated respectively with different phases of a set of polyphase voltages of the line and with different phases of a set of polyphase currents of the line for obtaining a plurality of derived voltage-responsive quantities and a plurality of derived current-responsive quantities, said derived voltage- and current-responsive quantities each containing a response to any positive- and negative-phase-sequence quantities which may be present in the respective sets of polyphase voltages and currents of the line but containing substantially no zero-phase-sequence component under the operating conditions under which the wattmetric relaying element is required to be responsive, and means for energizing said torque-producing elements from said derived voltage- and current-responsive quantities, said derived voltage- and current-responsive quantities being so chosen as to cause said wattmetric relaying element to be responsive to different optimum-phase-angle functions of $E_1\hat{I}_1$ and $E_2\hat{I}_2$, and to substantially eliminate responses to $E_1\hat{I}_2$, $E_2\hat{I}_1$, $E_0$ and $\hat{I}_0$, where $E_1$, $E_2$ and $E_0$ respectively represent positive, negative and zero-phase-sequence components of a set of polyphase voltages of the line, and $\hat{I}_1$, $\hat{I}_2$ and $\hat{I}_0$ respectively represent positive, negative and zero phase-sequence components of a set of polyphase currents of the line.

36. In a fault-protective relaying system for a three-phase line, a directional wattmetric relaying element having mutually reacting current and voltage windings, and means for so energizing the respective windings that said directional wattmetric relaying element is responsive to different functions of $E_1\hat{I}_1$ and $E_2\hat{I}_2$, and so as to substantially eliminate responses to $E_1\hat{I}_2$, $E_2\hat{I}_1$, $E_0$ and $\hat{I}_0$, where $E_1$, $E_2$ and $E_0$ respectively represent positive, negative and zero phase-sequence components of a set of polyphase voltages of the line, and $\hat{I}_1$, $\hat{I}_2$ and $\hat{I}_0$ respectively represent positive, negative and zero phase-sequence components of a set of polyphase currents of the line, in combination with a symmetrical linear transformation-means for contributing to the energization of said wattmetric relaying element, said symmetrical linear transformation-means comprising means for transforming a set of polyphase line-vectors $X_a$, $X_b$, $X_c$ having positive and negative phase-sequence components but substantially no zero-phase-sequence component under the operating conditions under which the wattmetric relaying element is required to be responsive, to a set of relaying vectors substantially as defined by the equations $$X'_a = rX_a + sX_b + tX_c,$$
$$X'_b = rX_b + sX_c + tX_a,$$
$$X'_c = rX_c + sX_a + tX_b,$$

where the constants $r$, $s$ and $t$ are real numbers having any values, positive or negative, except combinations in which two of the constants are zero, and combinations in which one of the constants is zero and the other two constants are substantially equal and opposite to each other.

37. In a fault-protective relaying system for a three-phase line of a type which is subject, at times, to a zero-phase-sequence component of a polyphase line-quantity, a directional wattmetric relaying element comprising a plurality of torque-producing elements operative upon a common movable member, in combination with means associated respectively with different phases of a set of polyphase voltages of the line and with different phases of a set of polyphase currents of the line for obtaining a plurality of derived voltage-responsive quantities and a plurality of derived current-responsive quantities, said derived voltage- and current-responsive quantities each containing a response to any positive- and negative-phase-sequence quantities which may be present in the respective sets of polyphase voltages and currents of the line but containing substantially no zero-phase-sequence component under the operating conditions under which the wattmetric relaying element is required to be responsive, and means for energizing said torque-producing elements from said derived voltage- and current-responsive quantities, said derived voltage- and current-responsive quantities being so chosen as to cause said wattmetric relaying element to be responsive to different functions of $E_1\hat{I}_1$ and $E_2\hat{I}_2$, and to substantially eliminate responses to $E_1\hat{I}_2$, $E_2\hat{I}_1$, $E_0$ and $\hat{I}_0$, where $E_1$, $E_2$ and $E_0$ respectively represent positive, negative and zero phase-sequence components of a set of polyphase voltages of the line, and $\hat{I}_1$, $\hat{I}_2$ and $\hat{I}_0$ respectively represent positive, negative and zero phase-sequence components of a set of polyphase currents of the line, said energizing means comprising a symmetrical linear transformation-means for transforming one of said sets of polyphase line-derived quantities from the values $X_a$, $X_b$, $X_c$ to new values as defined by the equations $$X'_a = rX_a + sX_b + tX_c,$$
$$X'_b = rX_b + sX_c + tX_a,$$
$$X'_c = rX_c + sX_a + tX_b,$$

where the constants $r$, $s$ and $t$ are real numbers having any values, positive or negative, except combinations in which two of the constants are zero, and combinations in which one of the constants is zero and the other two constants are substantially equal and opposite to each other.

38. In a three-phase electrical system of a type which is subject, at times, to conditions in which any or all of the positive, negative and zero phase-sequence components is likely to be present in a line-quantity, the combination of means for providing a polyphase set of line-derived quantities $X_a$, $X_b$, $X_c$ each containing a response to any positive- and negative-phase-sequence quantities which may be present in the line but containing substantially no zero-phase-sequence component, and a symmetrical linear transformation-means for transforming said quantities $X_a$, $X_b$, $X_c$ to new values as defined by the equations $$X'_a = rX_a + sX_b + tX_c,$$
$$X'_b = rX_b + sX_c + tX_a,$$
$$X'_c = rX_c + sX_a + tX_b,$$

where the constants $r$, $s$ and $t$ are real numbers having any values, positive or negative, except combinations in which two of the constants are zero, and combinations in which one of the constants is zero and the other two constants are substantially equal and opposite to each other.

EDWIN L. HARDER.